United States Patent [19]

Koike et al.

[11] Patent Number: 5,237,401
[45] Date of Patent: Aug. 17, 1993

[54] COLOR IMAGE READING APPARATUS INCLUDING COLOR CORRECTION MEANS

[75] Inventors: Keiichi Koike; Tsuneo Sato; Masatoshi Katoh, all of Kanagawa, Japan

[73] Assignee: Mitsubishi Denki Kabushiki Kaisha, Tokyo, Japan

[21] Appl. No.: 694,494

[22] Filed: May 2, 1991

[30] Foreign Application Priority Data

May 7, 1990 [JP] Japan .................................. 2-117162
May 21, 1990 [JP] Japan .................................. 2-132144

[51] Int. Cl.$^5$ ............................................. H04N 1/46
[52] U.S. Cl. ......................................... 358/518; 358/500
[58] Field of Search ............... 358/406, 400, 445, 443, 358/448, 75, 80; 382/17, 65, 50, 51, 52, 53

[56] References Cited

U.S. PATENT DOCUMENTS 4,839,722  6/1989  Barry et al. ............................ 358/75
4,866,512  9/1989  Hirosawa et al. ..................... 358/75

FOREIGN PATENT DOCUMENTS 0144188   6/1985   European Pat. Off. .
3636658   4/1987   Fed. Rep. of Germany .
3636702   5/1987   Fed. Rep. of Germany .
3821064   1/1989   Fed. Rep. of Germany .
61-191168  8/1986  Japan .
62-220060  9/1987  Japan .
62-293377 12/1987  Japan .

OTHER PUBLICATIONS

"NEC Technical Report vol. 41, No. 3/1988".

Primary Examiner—Edward L. Coles, Jr.
Assistant Examiner—Jerome Grant, II
Attorney, Agent, or Firm—Leydig, Voit & Mayer

[57] ABSTRACT

A color image reading apparatus includes a multi-chip image sensor having a plurality of image sensor units adapted to read a test chart comprising a color slip having a plurality of colors. A processing circuit is provided for automatically calculating color correcting coefficients, respectively, for the plurality of image sensors and storing them in memory. This will reduce problems of color reproducibility among image sensors and among image reading apparatus.

3 Claims, 5 Drawing Sheets

COLOR IMAGE READING APPARATUS INCLUDING COLOR CORRECTION MEANS

BACKGROUND OF THE INVENTION

This invention relates to a color image reading apparatus in a color facsimile system or color copying machine, in which a color image is converted into an electrical signal, so as to minimize the unevenness in color reproducibility of such apparatus.

FIG. 6 is a block diagram showing the arrangement of a conventional color image reading apparatus described, for instance, in the literature "NEC Technical Report Vol. 41, No. 3/1988". In FIG. 6, reference numeral 18 designates a CCD sensor with color filters for converting light reflected from a color original into electrical signals according to the colors; 19, a drive amplifier for amplifying the output electrical signals of the CCD sensor 18; 20, an A/D (analog-to-digital) converter for converting the output analog electrical signal of the drive amplifier 19 into a digital signal; 21, a signal processing circuit for performing signal processing operations such as shading correction and noise reduction; 22, an image reducing circuit for reducing an obtained image in compliance with a process done in the later stage; 23, a contour emphasizing circuit for emphasizing a contour part to improve the visual picture quality of a given image; 24, a ring buffer circuit for operating with a line memory circuit 29 which is provided for a pipe line process in order to process an image at high speed; 25, a color correcting circuit for correcting color signals according to correction coefficients which have been set in a table memory circuit 28; 26, an error diffusing circuit for applying a binary process such as error diffusion to a multi-valued image signal in response to a requisition from a printer or the like; and 27, a control circuit for controlling a series of operations from the processing of the signals read from the color original with the CCD sensor 18 up to the transmitting of the signals through the error diffusing circuit 26.

The operation of the conventional color image reading apparatus thus organized will be described.

The analog image signal, which the CCD sensor 18 has read from the color original, is amplified by the drive amplifier 19, and converted into multi-valued digital data by the A/D converter 20. The image signal thus processed is applied to the signal processing circuit 21, where noises are removed from the image signal, so that the latter signal is converted into a signal uniform in distribution without such as shading. In compliance with a requirement in aftertreatment, the output signal of the signal processing circuit is applied to the image reducing circuit 22, where it is subjected to image reduction, and the output signal of the image reducing circuit 22 is applied to the contour emphasizing circuit 23, where it is subjected to contour emphasizing. In order to correct the color signal thus obtained according to the color temperature of the light source and the color shift of a color filter in the reading of the original with the CCD sensor 18 or the color reproducing tendency of a printer or display in the aftertreatment system, to obtain an excellent color reproducibility, the output signal of the contour emphasizing circuit 23 is applied through the ring buffer circuit 24 to the color correcting circuit 25. In the color correcting circuit 25, a color correcting operation is carried out using correction coefficients which have been stored in the table memory circuit 28 in compliance with the actual conditions of the color image reading apparatus. The output of the color correcting circuit 25 is applied to the error diffusing circuit 26, where it is subjected to error diffusion, so that it is output as binary image data to an external printer or the like. The ring buffer circuit 24 cooperates with the line memory circuit 29 so that the image signal continuously transmitted thereto is subjected to pipe line process continuously, thus permitting a high speed operation.

The general tendency of the color image reading apparatus thus organized is such that, as was described before, the light source, the color separating filter, the CCD sensor's spectral sensitivity, and the color reproducing characteristic of output equipment such as a printer or display unit are not always ideal with the apparatus. Hence, it is necessary to subject the image data read to color correction, to improve the color reproducibility. In order to provide the ideal color reproducibility, it is necessary to store color correcting coefficients in the table memory in compliance with the actual conditions of those parts in advance. That is, the image signal read by the CCD sensor 18 is subjected to color correction in the color correcting circuit 25 using the correcting coefficients thus stored.

It is assumed that the original signals obtained through the CCD sensor 18 and the A/D converter 20 are represented by RI, GI and BI, respectively, and that the color signals corrected by the color correcting circuit 25 are represented by RO, GO, and BO, respectively (where R, G and B being primary colors "Red", "Green", and "Blue", respectively. In this case, the color correction is carried out according to the following expression (1):

$$\begin{bmatrix} RO \\ GO \\ BO \end{bmatrix} = \begin{bmatrix} a_{11} & a_{12} & a_{13} \\ a_{21} & a_{22} & a_{23} \\ a_{31} & a_{32} & a_{33} \end{bmatrix} \times \begin{bmatrix} RI \\ GI \\ BI \end{bmatrix} \quad (1)$$

where $a_{ij}$ (i=1 through 3, and j=1 through 3) is a correcting coefficient. The correcting coefficients are calculated and stored in the table memory circuit 28 in advance. In the color correcting circuit 25, its hardware carries out the color correcting operation using the correcting coefficients stored in the table memory circuit.

However, the different image reading apparatuses have different spectral characteristics due to their light sources, color separation filters, CCD sensors, display units, printers, etc. Therefore, application of the color correcting coefficients calculated in advance to a plurality of image reading apparatuses cannot make them coincident in color reproducibility with one another.

Further, in a multi-chip image sensor having a plurality of image sensor units, its different image sensor units have different spectral characteristics and, therefore, it is rather difficult to make them coincident in color reproducibility with one another.

Furthermore, in the case where the spectral characteristic changes positively with time as in the case of a light source or color separating filter, the color reproducibility cannot be improved with the correcting coefficients stored in the table memory circuit 28. This is a serious problem. This difficulty may be eliminated by revising the contents of the table memory circuit 28 in accordance with the actual conditions of the apparatus concerned. However, the operation of calculating new correcting coefficients for an apparatus given and writing them in the table memory circuit 28 is nearly impossible after the apparatus has been used.

As was described above, in the conventional color image reading apparatus, the color correcting coefficient is calculated outside the apparatus and stored in the memory in advance. Therefore, in the case where color image reading apparatuses are different in color reproducibility from one another, the adjustment cannot be made. Furthermore, it is difficult to rewrite the correcting coefficient. In the case where the apparatus has a plurality of image sensor units, it is difficult to eliminate the unevenness in characteristic of the image sensor units.

SUMMARY OF THE INVENTION

Accordingly, an object of this invention is to eliminate the above-described difficulties accompanying a conventional color image reading apparatus. More specifically, an object of the invention is to provide a color image reading apparatus in which, relative to color reproducibility, unevenness or changes with time, a color conversion treatment is performed to effectively eliminate those difficulties.

A color image reading apparatus according to the present invention comprises: a multi-chip image sensor having a plurality of image sensor units adapted to read a test chart comprising a color slip having a plurality of colors; and processing means for automatically calculating color correcting coefficients respectively for the plurality of image sensors, and storing them in memory means.

In the color image reading apparatus of the invention, the processing means automatically calculates color correcting coefficients for the data of the test chart comprising the color slip having the plurality of colors which is read by the plurality of image sensor units in the multi-chip image sensor. Therefore, the color correcting coefficients most suitable for a color image reading apparatus having its own spectral characteristics can be obtained and stored in the memory means; that is, the apparatus can have its own color correcting coefficients. This will eliminate the difficulty that a plurality of image sensor units are different in color reproducibility, or similarly a plurality of color image reading apparatus are different in color reproducibility.

DETAILED DESCRIPTION OF PREFERRED EMBODIMENTS

Preferred embodiments of this invention will be described with reference to the accompanying drawings.

Figure 1:
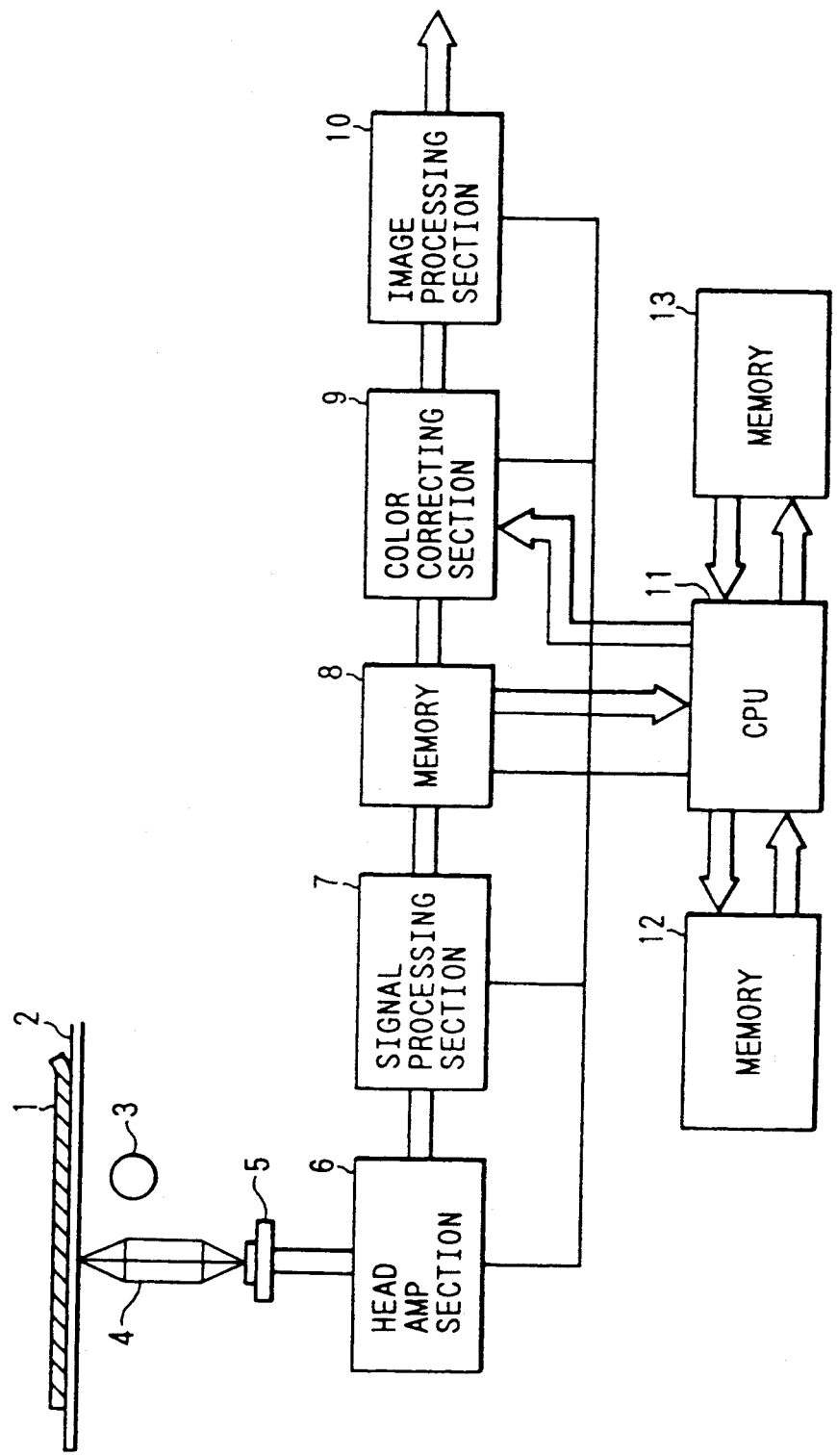
FIG. 1 is a block diagram showing the arrangement of a color image reading apparatus, a first embodiment of the invention.

FIG. 1 is a block diagram showing the arrangement of a first embodiment of the invention, a color image reading apparatus. In FIG. 1, reference numeral 1 designates an original; 2, a glass plate on which the original 1 is placed; 3, a light source for irradiating the surface of the original; and 5, a multi-chip image sensor having a plurality of image sensor units.

The multi-chip image sensor 5 has been disclosed, for instance, by Unexamined Japanese Patent Publication No. Sho-62-293377/(1987). More specifically, the sensor 5 comprises a plurality of (five) color image sensor units for each of which a correction circuit is provided.

The outputs of the multi-chip color image sensor are applied to the correcting circuits in a serial mode according to the order of arrangement of filters. In each correcting circuit, a coupling capacitor operates to remove a DC component from the output thus applied, and two transistors amplify the resultant output. Furthermore, during red, green and blue timing intervals, a switch is operated by the output of a shift register, so as to connect a resistor between the emitters of the two transistors. The outputs of the two transistors are applied to a differential amplifier. The output of the differential amplifier is adjusted to the ratio of the emitter resistance to the collector resistance (or load resistance) of the transistors, so that the outputs of the multi-chip color image sensor provided for the colors comply with the outputs of the differential amplifier.

That is, color signal correcting circuits are provided for all the color image sensors outputting the color separation image signals of three colors, to correct the unevenness of the outputs of the color sensors.

Referring back to FIG. 1, reference numeral 4 designates image focusing means such as a rod lens array for forming the image of the surface of the original 1 on the multi-chip image sensor 5.

The image of the original 1 formed on the multi-chip image sensor 5 is converted into an electrical signal by the image sensor. The output analog signal of the multi-chip image sensor 5 is applied to a head amplifier section 6, where it is digitized and amplified. The output image signal of the head amplifier section 6 is processed by a signal processing section 7. The image data processed by the signal processing section 7 is temporarily stored in a memory 8.

Further in FIG. 1, reference numeral 9 designates a color correcting section for improving the color reproducibility of the image data; 10, an image processing section for adjusting a picture quality; 11, a CPU (central processing unit) for controlling the whole color image reading apparatus and calculating a color correcting coefficient; 12, a memory for temporarily storing image data; and 13, a memory as a color correcting coefficient storing means for storing the color correcting coefficient thus calculated.

The color correcting coefficient storing means, as disclosed by Unexamined Japanese Patent Publication No. Sho-62-220060/(1987), is designed as follows: In the case where the optical image data obtained by optically scanning the surface of an original is read by sampling it for each image, and subjected to multi-valued quantization and to $\Gamma$ correction, in order to obtain a density reference signal for $\Gamma$ correction prior to the reading of the original's image a plurality of reference surfaces different in density are provided on an optically scanning density reference board.

The density reference board is optically scanned and the data read by a line image sensor. At the same time, the data read by the line image sensor is employed as a density reference value in the Γ correction of the digital image data of an original, read later, which is subjected to multi-valued quantization.

Now, the operation of the color image reading apparatus thus organized will be described.

A test chart 31 is placed, as the original 1, on the glass plate 2, and irradiated by the light source 3. Light reflected from the test chart 31 is applied through the image focusing means 4 to the multi-chip image sensor 5. That is, the image of the test chart is formed on the multi-chip image sensor 5, where it is converted into an electrical signal.

The data of the test chart read by the multi-chip image sensor 5 is amplified and subjected to A/D (analog-to-digital) conversion by the head amplifier section 6. The resultant digital signal is applied through the signal processing section 7 to the memory 8, where it is temporarily stored.

The data of the test chart stored in the memory 8 is compressed by the CPU 11. The data thus compressed is stored in the memory 12.

The above-described operation is carried out repeatedly with a color slip having a plurality of colors. Thereafter, based on the compressed data of the test chart stored in the memory 12, the CPU 11 calculates the most suitable color correcting coefficients for the plurality of image sensor units forming the multi-chip image sensor 5. The color correcting coefficients thus calculated are stored in the memory 13.

In reading the image, the color correcting coefficients thus calculated and stored are transferred through the CPU 11 to the color correcting section 9, where the image data from the plurality of image sensor units are individually color-corrected with the color correcting coefficients provided respectively for the image sensor units into image data excellent in color reproducibility, which are outputted through the image processing section 10.

Figure 2:
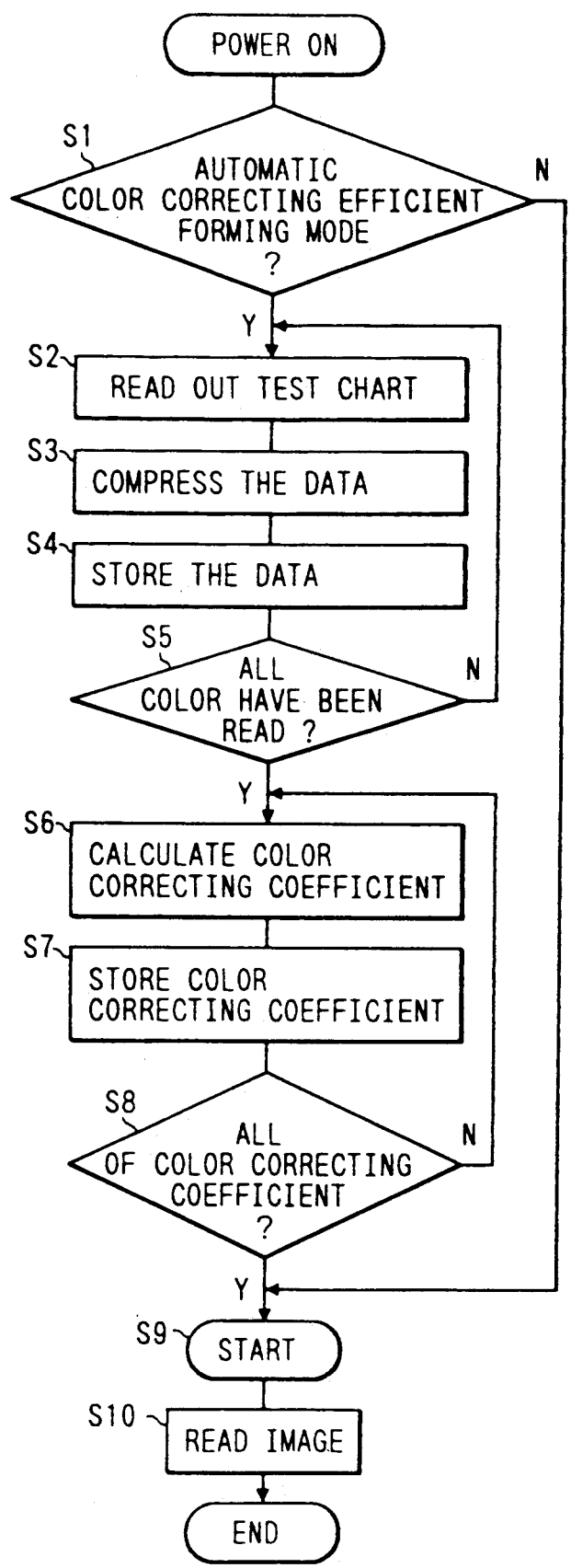
FIG. 2 is a flow chart for a description of the sequential operations of the apparatus shown in FIG. 1.
Figure 3:
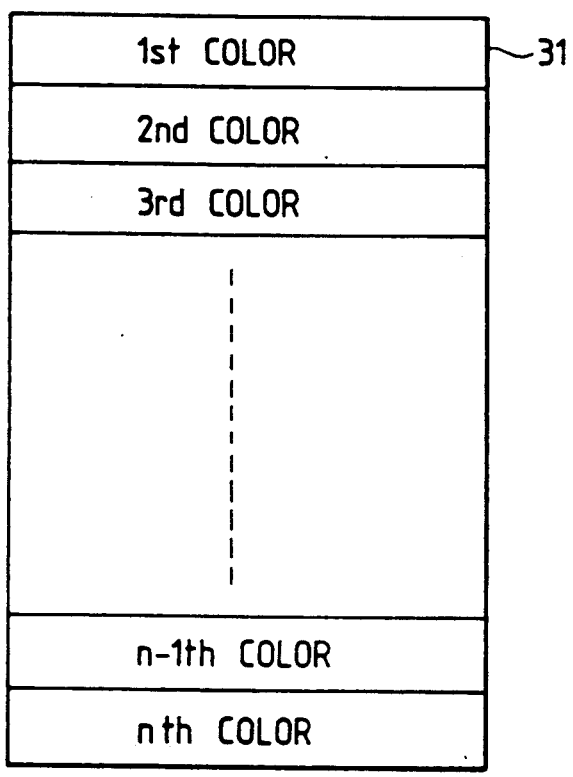
FIG. 3 is a color correcting efficient calculating test chart employed in the apparatus shown in FIG. 1.
Figure 4:
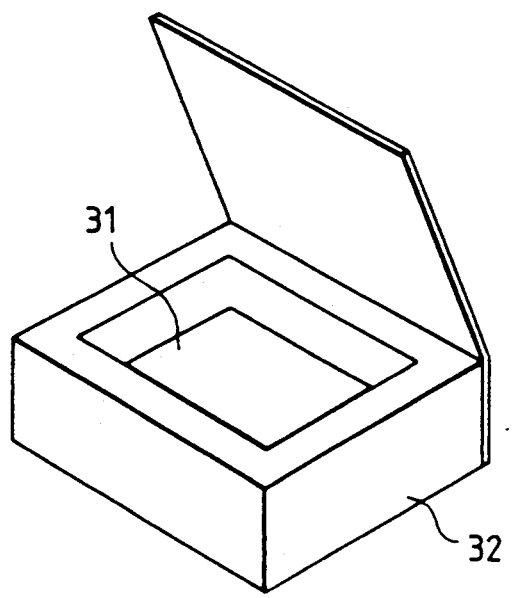
FIG. 4 is an explanatory diagram showing the test chart placed on a scanner.

FIG. 2 is a flow chart for a description of the sequential operation of the color image reading apparatus which has a function of automatically calculating color correcting coefficients. FIG. 3 shows the test chart with the color slip having a plurality of colors for calculation of color correcting coefficients. FIG. 4 shows the test chart placed on the original placing surface of the image reading apparatus.

When the power switch is turned on ("Power On" in FIG. 2), the test chart 31 shown in FIG. 3 is placed on the glass plate of the image reading apparatus 32 as shown in FIG. 4. In Step S1 of FIG. 2, an automatic color correcting efficient forming mode is selected, and then Step S2 is effected.

In Step S2, the data of the first color is read with the multi-chip image sensor 5, and stored in the memory 8. In Step S3 the data in the memory 8 is compressed by the CPU, and in Step S4 the data thus compressed is stored in the memory 12.

The above-described series of operations are carried out for each of the N colors. In Step S5, the CPU 11 determines whether or not all the colors have been read. When it is determined that all the colors have been read, Step S6 is effected. In Step S6, a color correcting coefficient is calculated for each of the image sensor units. In Step S7, the CPU 11 operates to store the correcting coefficients in the memory 13.

The above-described operations are automatically carried out in the color image reading apparatus. After all the color correcting coefficients have been stored in Step S7, in Step S8 the CPU 11 determines whether or not all of the color correcting coefficients for each image sensor have been calculated. When it is determined that the all the color correcting coefficients have been calculated, Step S9 is effected. An original to be read is placed on the scanner 32, and an instruction is issued to read the original. Thereafter, an image reading step is carried out. That is, the light receiving section 1 performs an original reading operation, the signal processing circuit 7 carries out an image processing operation in a predetermined manner, and the image is stored in the memory circuit 8. On the other hand, the color conversion coefficient stored in the memory circuit 13 is transferred through the CPU 11 to the color conversion circuit 9, in which the image data from the memory circuit 8 is subjected to color conversion using the color conversion coefficient transferred from the memory circuit 13. The output of the color conversion circuit is output through the image processing circuit 10. Therefore, the color image reading operation is carried out in accordance with the color conversion coefficient which will optimizes the color reproduction of the test chart 31. This will correct the variation in color reproducibility which is due to the unevenness in characteristic of the apparatus or to the lapse of time.

Thereafter, each color original reading operation is performed according to the color conversion coefficient stored in the memory circuit 13, and therefore it is unnecessary to read the test chart for every original reading operation.

The calculation of a conversion coefficient to be stored in the memory 13 is carried out according to the reading of the test chart 31. The calculation may be performed on, or it may be carried out manually when required, or it may be conducted when the apparatus is shipped out of the factory or during maintenance. In the case where it is required for the memory circuit 13 to hold the color conversion coefficient even when the power switch is turned off, it is necessary to provide a backup power source for the memory circuit 13 or to employ a non-volatile memory as the memory circuit 13.

The above-described compression of the data is to reduce the quantity of data in the memory which is to be stored in the memory 12. For this purpose, a conventional data compressing method may be suitably employed; however, a method may be employed in which, in the image sensor, the average value is obtained to reduce the amount of data.

Figure 5:
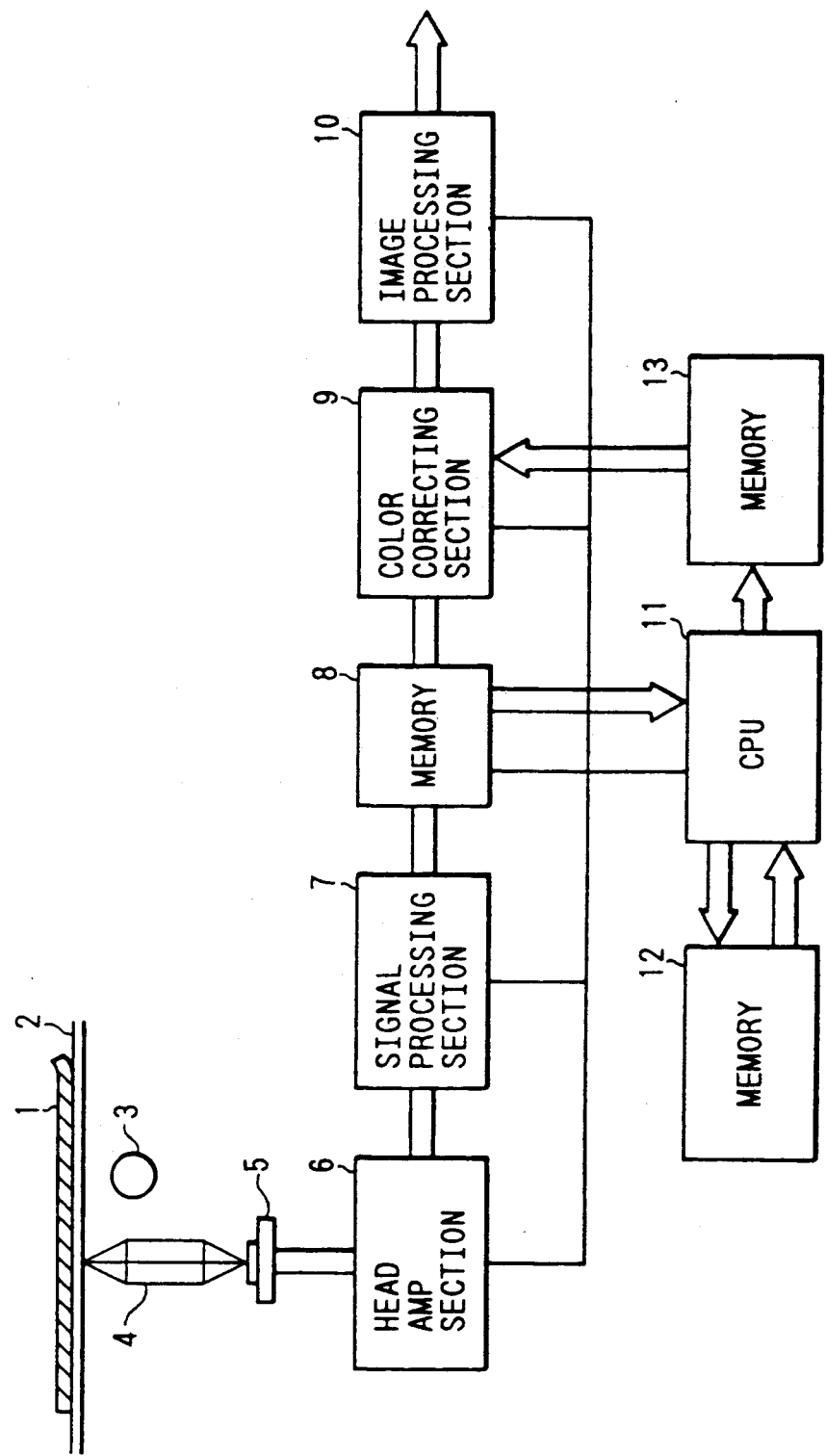
FIG. 5 is a block diagram showing the arrangement of a second embodiment of the invention.
Figure 6:
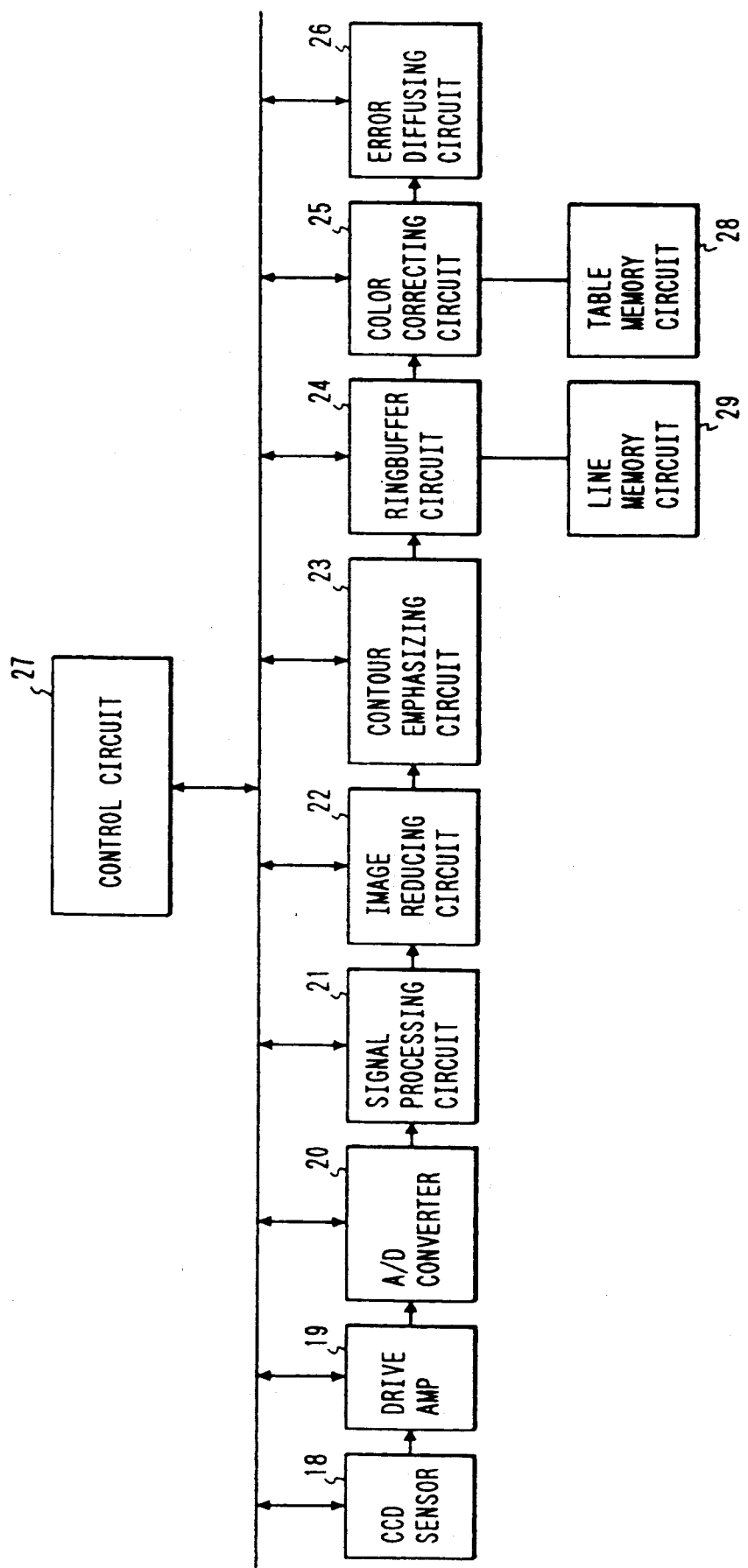
FIG. 6 is a block diagram showing the arrangement of a conventional color image reading apparatus.

FIG. 5 is a block diagram showing the arrangement of a second embodiment of the invention. In FIG. 5, reference numerals 1 through 13 designate the same items as those in FIG. 1. In FIG. 5, the CPU 11 operates the data of the test chart stored temporarily in the memory 12, to calculate color correct coefficients, which are stored in the memory 13.

In reading the image data, the color correcting coefficients which have been calculated and stored are directly referred to as a look-up table in the correcting section. Thus, the second embodiment has the same effects as the first embodiment. Furthermore, in the operation, the CPU 11 is not used, and the processing speed is increased as much.

In the above-described embodiment, the test chart employed has a plurality of color parts different in lightness and in saturation; however, it should be noted that the invention is not limited thereto or thereby. An extreme statement may be made that the test chart may be white in its entirety. In this case, the color conversion coefficient is so determined that the most suitable white balance and white level value are obtained. That is, the test chart may be appropriately selected in compliance to the characteristics of the various parts concerning the reproduction of colors.

As was described above, the color image reading apparatus is designed to calculate color correcting coefficients automatically for the image sensor units of the multi-chip image sensor, respectively. Therefore, the color image reading apparatuses according to the invention are substantially equal in color reproducibility, and high in reliability.

What is claimed is:

1. A color image reading apparatus comprising: means for irradiating a surface of an original;
    a multi-chip image sensor having a plurality of sensor units positioned to convert light reflected from the surface of the original into electrical signals;
    a pre-amplifier which amplifies and digitizes signals transmitted by said multi-chip image sensor;
    a signal processor which processes the image data digitized by said pre-amplifier;
    a first memory;
    a second memory;
    a third memory connected to said signal processing section which stores the digitized image data;
    a processing device connected to said first, second and third memories which compresses the digitized image data stored in said third memory and stores the compressed data into said first memory and which computes respective color correction coefficients for the plurality of the image sensor units using the data stored in said third memory and stores the color correction coefficients into said second memory; and
    color correction means for color correcting image data stored in said third memory using the color correction coefficients stored in said second memory.

2. A color image reading apparatus as claimed in claim 1, wherein said color correction means is directly connected to said second memory so as to access the color correction coefficients without communication with said processing device.

3. A color image reading apparatus as claimed in claim 1, wherein said color correction means is connected to said processing device wherein said processing device fetches the color correction coefficients from said second memory and transmits the color correction coefficients to said color correction means.

* * * * *